US006934736B2

(12) United States Patent
Sears, Jr. et al.

(10) Patent No.: US 6,934,736 B2
(45) Date of Patent: Aug. 23, 2005

(54) SYSTEMS AND METHODS FOR AUTOMATICALLY GENERATING COOKIES

(75) Inventors: Stephan Bartlett Sears, Jr., Campbell, CA (US); Sarah C. Moussa, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 09/808,857

(22) Filed: Mar. 15, 2001

(65) Prior Publication Data

US 2002/0133540 A1 Sep. 19, 2002

(51) Int. Cl.[7] .............................................. G06F 15/16
(52) U.S. Cl. ........................ 709/203; 709/219; 709/228
(58) Field of Search ................................ 709/203, 219, 709/228; 705/26, 27; 713/201; 725/45, 46

(56) References Cited

U.S. PATENT DOCUMENTS

| | | | | | |
|---|---|---|---|---|---|
| 5,826,242 | A | * | 10/1998 | Montulli ...................... 705/27 |
| 6,189,000 | B1 | * | 2/2001 | Gwertzman et al. .......... 707/1 |
| 6,424,981 | B1 | * | 7/2002 | Isaac et al. ................. 715/513 |
| 6,490,601 | B1 | * | 12/2002 | Markus et al. .............. 715/507 |
| 6,539,424 | B1 | * | 3/2003 | Dutta ......................... 709/219 |
| 2002/0007317 | A1 | * | 1/2002 | Callaghan et al. ........... 705/26 |
| 2002/0112154 | A1 | * | 8/2002 | Wallace ...................... 713/153 |
| 2002/0133719 | A1 | * | 9/2002 | Westerdal ................... 713/201 |
| 2003/0040958 | A1 | * | 2/2003 | Fernandes ................... 705/14 |

FOREIGN PATENT DOCUMENTS

WO   WO 01/01280 A2 * 1/2001 ........... G06F/17/00

OTHER PUBLICATIONS

Schwartz, Randal. L. Parallel User Agents for Link Checking Web Techniques, Jul. 1998, pp. 28, 30–32.
Kruger, Peter Identify Yourself Communications International, Internet.

* cited by examiner

*Primary Examiner*—John Follansbee
*Assistant Examiner*—Aaron C Perez-Daple
(74) *Attorney, Agent, or Firm*—Workman Nydegger (57) ABSTRACT

A "cookie" is a set of information, such as user information and preferences, used by web sites to customize information for a user. A number of web sites register with a "cookie server" and provide the server with information regarding what data fields are expected in cookies submitted from clients to the web site. When a client subsequently browses to that web site, the client first checks with the cookie server for any expected cookies. The cookie server uses the cookie requirement information for that web site, along with user specific information, to generate one or more cookies. The cookie server then transmits the one or more cookies to the client. The client then transmits the one or more cookies to the web site so that the web site may provide a customized web page.

25 Claims, 4 Drawing Sheets

SYSTEMS AND METHODS FOR AUTOMATICALLY GENERATING COOKIES

BACKGROUND OF THE INVENTION

1. The Field of the Invention

The present invention relates to network communications. In particular, the present invention relates to systems and methods for automatically generating network cookies that may be used by network sites to customize services.

2. The Prior State of the Art

The world has greatly benefited by computer networks such as the Internet that allow individuals to access services such as electronic mail, Web site navigation, chat room participation, and instant messaging. Computer systems that offer services are called "servers" while computer systems that obtain services are called "clients." One frequent type of requested service is the downloading of a Web page from a Web site.

When a client sends a request for a service, the server may often like to customize the service using information relevant to the client. For example, if the server offers a weather forecasting Web page, the server might like to know the geographical location of the client so that the Web page might be customized to show the weather forecast for the client's geographical location. The server may find out this information by simply having the user enter the desired information. For example, when navigating to a Web page using a Web browser, the client may display a log-on page that allows the user to enter desired information such as name, address, preferences, and the like in identified fields. Upon logging in, the server would then be able to use this information to customize services.

Requiring that the user enter this information every time they request a service from a network site can be quite cumbersome to the client. Therefore, servers often cause "cookies" to be stored on the client. A "cookie" is information about a client that is provided by the client to a particular network site when requesting a service from the particular network site. Conventional networking protocols allow for servers to cause such cookies to be stored on the client. When a client subsequently makes a request for a service, the client automatically provides the cookie to the server so as to aid the server in customizing service.

Each cookie is specific to a particular server. When accessing a Web site, only the cookie(s) associated with that Web site are provided to the Web site. This is desirable from a security perspective since it prevents renegade Web sites from accessing information about the user that the user did not wish to share with that renegade Web site. One drawback of this, however, is that every time a user visits a Web site that does not have an associated cookie stored on the client, the user might need to re-enter information for the new Web site. This can be quite cumbersome for the user, especially in situations where the security concerns behind automatically providing information to the new Web site do not outweigh the convenience for the user in foregoing the need to manually enter information.

For example, the new Web site could be affiliated with a Web site with whom the user has already chosen to share information. Suppose that a user desires to purchase a book but also give special shipping instructions to the shipper. The user had previously navigated to an on-line bookstore and entered relevant information which is now stored on the client in the form of a cookie. Now, upon navigating to the same on-line bookstore Web site, the user does not need to enter the information since the cookie is provided to the on-line bookstore Web site.

The user now desires to enter special shipping instructions and thus selects a link entitled "Special Shipping Instructions" which navigates the user to a shipping Web site managed by a shipping company that handles all of the on-line bookstore shipments. Assuming that this is the user's first visit to the shipping Web site, the user would be required to re-enter much of the same information even though the shipping Web site is affiliated with the on-line bookstore and is subject to the same duty of confidentiality as the on-line bookstore.

In light of the prior art, it would therefore, be advantageous to provides systems and methods for providing client information to Web sites for which there is no corresponding cookie. It would further be advantageous to provide such client information without burdening the user with entering such client information.

SUMMARY OF THE INVENTION

A "cookie" is a set of information, such as user information and preferences, used by web sites to present customized web pages to users. Conventionally, such cookies are generated by a server and stored on a client computer system. When the client navigates to a web site, the client browser software checks for locally stored cookies associated with the web site. If a cookie is found, the client transmits the cookie to the server. The server then uses the information from within the cookie to provide customized web pages for the user.

In accordance with the present invention, a "cookie" server automatically generates a cookie for a client. A number of web sites register with a server (hereinafter called a "cookie server") and provide the server with information regarding what data fields are expected in cookies submitted from clients to the web site (hereinafter called "cookie requirement information"). These registered sites are listed in a cookie list provided to the client when the client logs into the cookie server. When a client subsequently initiates a connection to a web site within the cookie list, in addition to checking for any locally stored cookies, the client will indicate to the cookie server that it is connecting to the web site. The cookie server then uses the cookie requirement information for the web site, as well as user specific information, to generate one or more appropriate cookies that the web site may use. The cookie server then transmits the generated cookie(s) to the client. The client may then provide the cookie(s) to the web site so that the web site may provide a customized web page to the client.

The principles of the present invention facilitate numerous advantages over the conventional state of the art. For example, instead of the user having to manually enter information so that the web site may generate cookie(s), the cookie(s) are automatically generated by the cookie server. This allows a user to provide personalization information once and then access a set of sites as if it was a unified service, receiving a consistent user experience.

For example, suppose that a user desires to order a book from an on-line bookstore Web site. The user would be required to enter user information relevant to the purchase. The user might then select a "Special Shipping Instructions" link which navigates the user to the association shipping web site. Conventional methods often require that the user once again enter for the shipping Web site much of the same user information that was entered for the on-line bookstore Web site. The present invention, however, allows the user to enter this user information once, and allows that user information to be shared with other affiliated sites. Thus, the user appears to be dealing with one unified entity from the standpoint of having to enter user information when, in fact, there may be several associated on-line entities with which the user is communicating.

Another advantage is that the user need not expend energy reentering user information that the user has already entered. This is especially advantageous when using relatively small devices that have limited user input facilities such as wireless telephones and Personal Digital Assistants (PDAs).

In addition, the client need not store the cookie. Instead, the automatically generated cookie for a particular web site may be stored at the cookie server for transmission to the client when the client subsequently navigates to the web site. Even if the cookie is not stored at the cookie server, the cookie server may still regenerate the cookie each time the client navigates to the web site. This latter case also does not require that the client store the cookie. Thus, client memory may be preserved. This is also especially advantageous in devices that have limited memory.

Furthermore, the present invention allows the cookie to be more dynamic. For example, a user may have hundreds of associated cookies that are used when navigating to hundreds of different Web sites. If the user moves, for example, the user's address and zip code will change. Conventionally, in order to optimize service at these hundreds of web sites, the user would have to navigate through these web sites, and change the address for each web site, thereby allowing the web site to change the corresponding cookie at the client.

The present invention allows the user to change the user information in each of these cookies by simply changing the user information stored at the cookie server. The cookie server would then update all of the corresponding cookies that the server is storing. Alternatively, the user would wait until a subsequent navigation to the web site when the cookie server would generate a cookie with the new user information without requiring further user input. Thus, when the user's information changes, the user need not engage in further data entry as the user navigates to each of the web sites. Instead, the user only changes the user information at the cookie server. This further enhances the unified experience of the user since the user only makes personal information changes once for all associated Web sites thereby giving the impression that the user is dealing with one unified entity.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for automatically generating cookies for clients. A "cookie" is a set of information, such as user information and preferences, used by web sites to customize information for a user. A number of web sites register with a server (hereinafter called a "cookie server") and provide the server with information regarding what data fields are expected in cookies submitted from clients to the web site (hereinafter called "cookie requirement information"). When a client subsequently prepares to browse to that web site, the client will first check the cookie server for any automatically generated cookies. The cookie server looks up user specific information based on the cookie requirement information for that web site. The cookie server then transmits the relevant information in the form of one or more cookies to the client. The client then transmits the one or more cookies to the web site so that the web site may provide a customized web page for the client.

The embodiments of the present invention may comprise a special purpose or general purpose computer including various computer hardware, as discussed in greater detail below. Set top boxes that enhance the capabilities of conventional televisions represent an example of a special purpose computer. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transfer or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The present invention may be implemented in any computer network environment that facilitates network navigation to web sites. For example, computing devices such as desk-top computers, lap-top computers, Personal Digital Assistants (PDAs), wireless telephones, set top boxes and the like may execute thereon web site navigation software which allows for information such as web pages to be downloaded from web sites through a logical connection with the web site.

Figure 1:
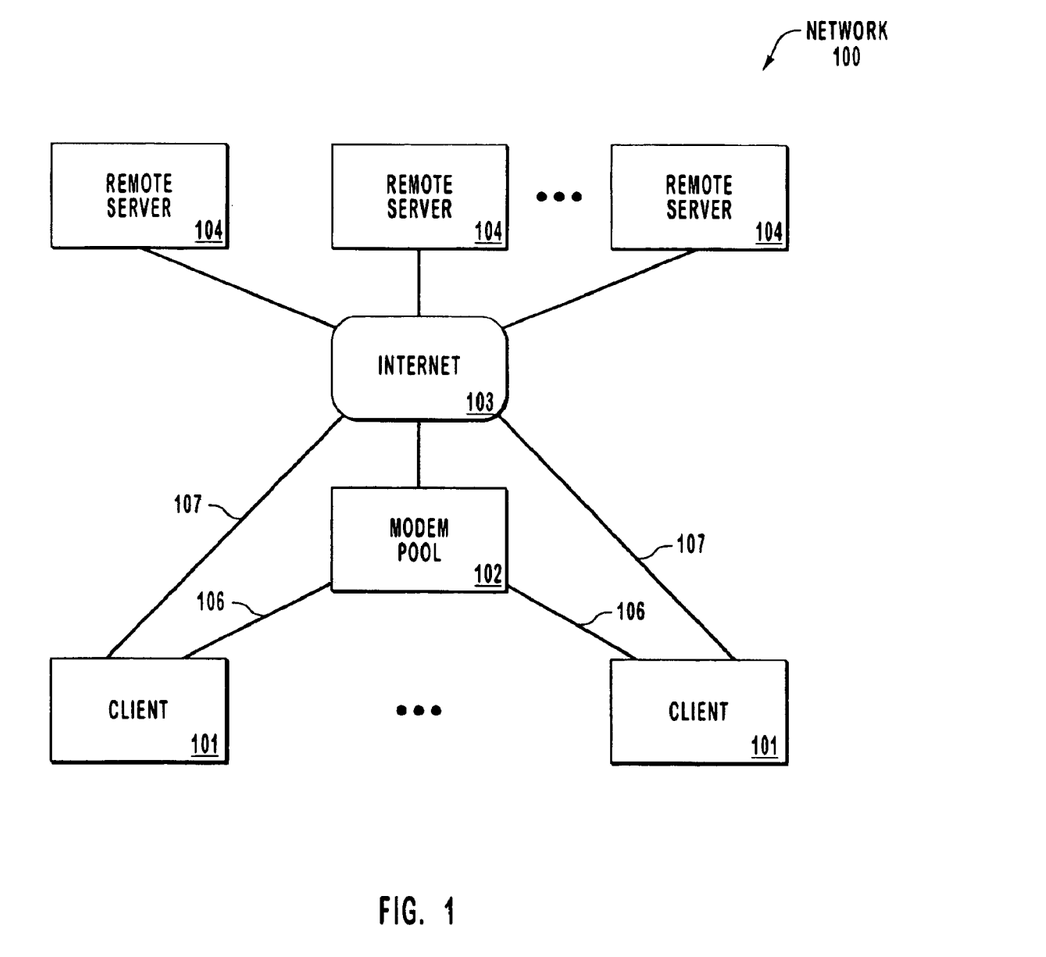
FIG. 1 illustrates a network system in which the present invention may operate.

FIG. 1 illustrates a basic configuration of a network 100 in which the present invention may be implemented. A number of clients 101 are coupled to the Internet 103. This connection may be direct bi-directional data connections 107 which may be, for example, cable RF lines. Alternatively, the connection may be via a modem pool 102 using direct-dial, bi-directional data connections 106, which may be telephone (POTS, i.e., "plain old telephone service"), ISDN (Integrated Services Digital Network), or any other similar type of connection. The modem pool 102 is coupled typically through a router, such as that conventionally known in the art, to a number of remote servers 104 via a conventional network infrastructure 103, such as the Internet.

Figure 2:
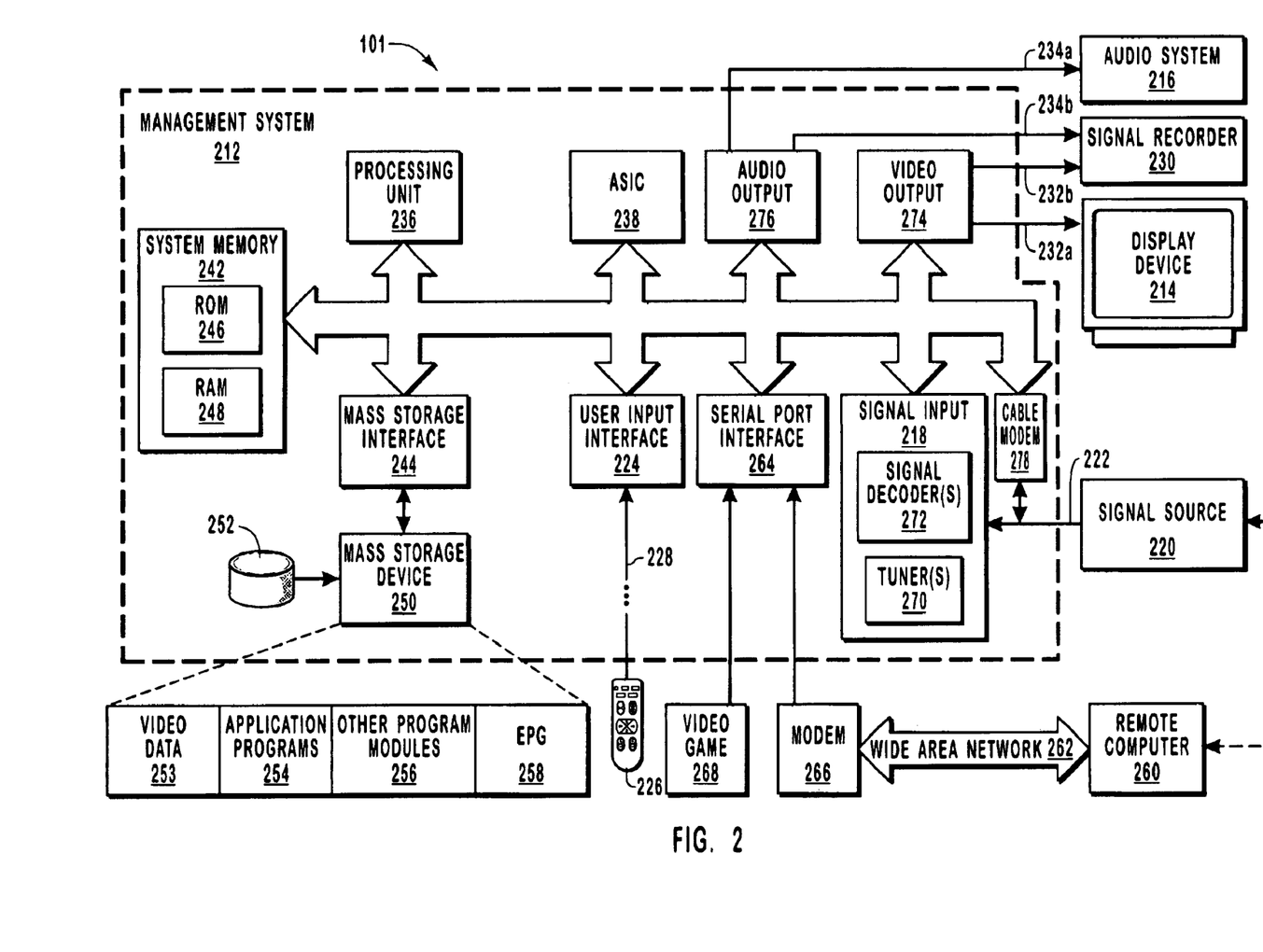
FIG. 2 illustrates the detailed structure of one of the client systems of FIG. 1.

FIG. 2 illustrates a client 101 in further detail. The client 101 may facilitate television viewing in addition to web site navigation. While it is the web site navigation functionality of the client that is primarily involved with implementing the present invention, all of the primary elements of the client 101 will now be described for completeness, regardless of whether those elements contribute to web site navigation or television programming viewing.

The client 101 includes a display device 214 and an audio system 216. The display device, which may be a high definition television display, a standard television display, a flat panel display, a projection device, a high definition television display, a computer monitor, or any other device capable of displaying images or video represented by image or video data. Audio system 216 may be a speaker, a stereo system, or any device capable of presenting sound represented by sound data.

The client 101 also includes a management system 212, which may be a set-top box or other component that has been adapted to facilitate web browsing and television viewing using the display device 214 and audio system 216. Management system 212 may be integrally positioned with or separate from display device 214 and/or audio system 216.

Management system 212 includes a signal input 218, which receives programming from a signal source 220. The programming is transmitted from signal source 220 to signal input 218 via a programming input line 222, which can be a cable or optic connection, a terrestrial antenna system, a satellite system, or any device or system capable of transmitting programming to home management system 212.

The management system 212 also may include a cable modem 278 which may receive data, such as a Web page, from a remote server 260 (e.g., one or remote servers 104 of FIG. 1), where the data has been appropriately routed through signal source 220 to the programming input line 222. The cable modem 278 may also provide data over the programming input line 222, back to the signal source 220 for appropriate routing to the remote server 260. Thus, the programming input line 222 may act as the bi-directional data connection 107 described above with respect to FIG. 1. In this example, the signal source 220 would be a cable company head end that has a dedicated connection with the Internet. This communication may use the DOCSIS, DAVIC, or other communication standards to establish the communication link over a standard RF cable.

While FIG. 2 illustrates the client 101 as having a single programming input line 222 and a single signal source 220, there can instead be a plurality of programming input lines that transmit programming from a plurality of signal sources. In such embodiments, the client may receive the programming from one signal source or from a plurality of signal sources at a time.

Management system 212 also includes a user input interface 224, which receives input from an input device 226, such as a remote control, keyboard, microphone, or any other device capable of generating electronic instructions for management system 212. Input device 226 is communicatively coupled to management system 212 over an input link 228 so as to enable such control. Input device 226 generates electronic instructions over input link 228 in response to preprogrammed data or in response to a viewer pressing buttons on input device 226. Input device 226 may also control web browser software within management system 212 as when management system 212 is a set-top box or an Internet terminal that has been adapted to perform web browsing as described herein. For instance, input device 226 may be programmed to turn on client 101 and to tune management system 212 to a channel.

FIG. 2 illustrates a signal recorder 230, which is capable of receiving video and/or audio data and recording the data on a storage medium. Video signals are transmitted to signal recorder 230 and/or display device 214 by video image link 232, examples of which include a radio-frequency ("RF") link, an S-video link, a composite link, or any other equivalent form of video image link. Similarly, audio link 234 transmits audio data from the client 101 to audio system 216 or to signal recorder 230.

The operation of the management system 212 is controlled by a central processing unit ("CPU"), illustrated as processing unit 236, which is coupled to an application-specific integrated circuit ("ASIC") 238 and uses computer-executable instructions implemented in software and/or hardwired logic circuitry. Processing unit 236 and ASIC 238 are coupled via a system bus 240, which also interconnects various other system components, such as the system memory 242, mass storage interface 244, user interface 224 and signal input 218. Processing unit 236 executes software designed to implement features of management system 212 including features of the present invention. ASIC 238 contains circuitry that is used to implement certain functions of management system 212. Instructions, data, and other software necessary for the operation of processing unit 236 and ASIC 238 may be stored in the system memory 242, such as in read-only memory ("ROM") 246 and/or in random-access memory ("RAM") 248, and/or in a mass storage device 250, which is coupled to mass storage interface 244. ROM 246, RAM 248 and mass storage device 250 are communicatively coupled to ASIC 238 so as to be readable by ASIC 238 and so that data may be written from ASIC 238 to RAM 248 and possibly mass storage device 250.

Mass storage device 250 may be a magnetic hard disk 252 or any other magnetic or optical mass memory device that is capable of storing large amounts of data. Any desired computer-readable instructions or data, including application programs 254, other program modules 256, and an Electronic Programming Guide ("EPG") 258, which specifies the broadcast times and channels of programs can be stored in mass storage device 250. Mass storage device 250 can also be used to record video data 253, in which case, management system 212 operates as a digital video recorder.

EPG data may be obtained in a variety of manners. For instance, the EPG data can be supplied to management system 212 by a remote computer 260, such as a server, and stored on mass storage device 250. The EPG data is supplied on a regular basis to continually maintain a current schedule of programming at the management system 212. Where home entertainment system 212 is associated with the Internet, the data included in the EPG may be downloaded from the Internet. Alternatively, the EPG may delivered to the home entertainment system by using a direct-dial communication over standard telephone lines, or by using data transmission over the cable television infrastructure, a satellite network, an over-the-air broadcasting or any other available medium.

As described above with reference to FIG. 1, the client 101 may also communicate with remote servers 104 using a connection 106 to a modem pool 102. This communication may occur by the management system 212 communicating with the remote computers 260 over a network such as wide area network 262. Communication over a wide area network is facilitated by a serial port interface 264 that is interposed between the system bus 240 and a modem 266, a wireless link, or other means for establishing communications over a WAN that may be internal or external to management system 212. Management device 212 is also capable of transmitting information via the network (e.g., the Internet) by direct-dial communication over standard telephone lines, or by using any other available communication medium as described above with reference to FIG. 1.

While serial port interface 264 may be utilized to connect a modem 266 for communicating across a WAN, serial port interface may also be utilized to connect other consumer electronic devices, such as video game 268, and/or various input devices, such as a keyboard (not shown) or joystick (not shown), to the management system 212.

Referring now to signal input 218, if the signal on programming input line 222 includes multiple channels, a tuner 270 included in signal input 218 tunes to a selected channel in the signal. Multiple tuners 270 can be used to provide enhanced viewing features, such as picture-in-picture (PIP), recording one channel while viewing another, and recording a plurality of channels simultaneously A signal decoder 272 converts video data from an analog format to a digital format, or from a digital format to an analog format, in the event that ASIC 238 and tuner 270 employ different formats. Video decoder 272 also decodes video data from a compressed video format (e.g. MPEG). In embodiments where the management system 212 includes multiple tuners 270, the management system 212 may also include multiple signal decoders 272 to perform the operations disclosed herein.

The management system 212 also includes a video output 274, which may include a video encoder and/or a video converter. The video encoder assigns a code to frames of video data that are transmitted across a video image link 232 and switches between analog and digital formats as necessary. Similarly, audio output 276 can include an audio converter to provide the necessary switching between analog and digital formats.

While FIG. 2 and the corresponding discussion above provide a general description of a suitable environment in which the invention may be implemented, it will be appreciated that the features of the present invention disclosed herein may be practiced in association with a variety of different system configurations. In particular, as described herein, the principles of the present invention are particularly advantageous where client have limited memory capacity and limited input means. Therefore, while the principles of the present invention will be advantageous in all types of web browsing environment, they may be especially useful when using telephones, Personal Digital Assistants or other limited input and memory devices when browsing web sites.

Figure 3:
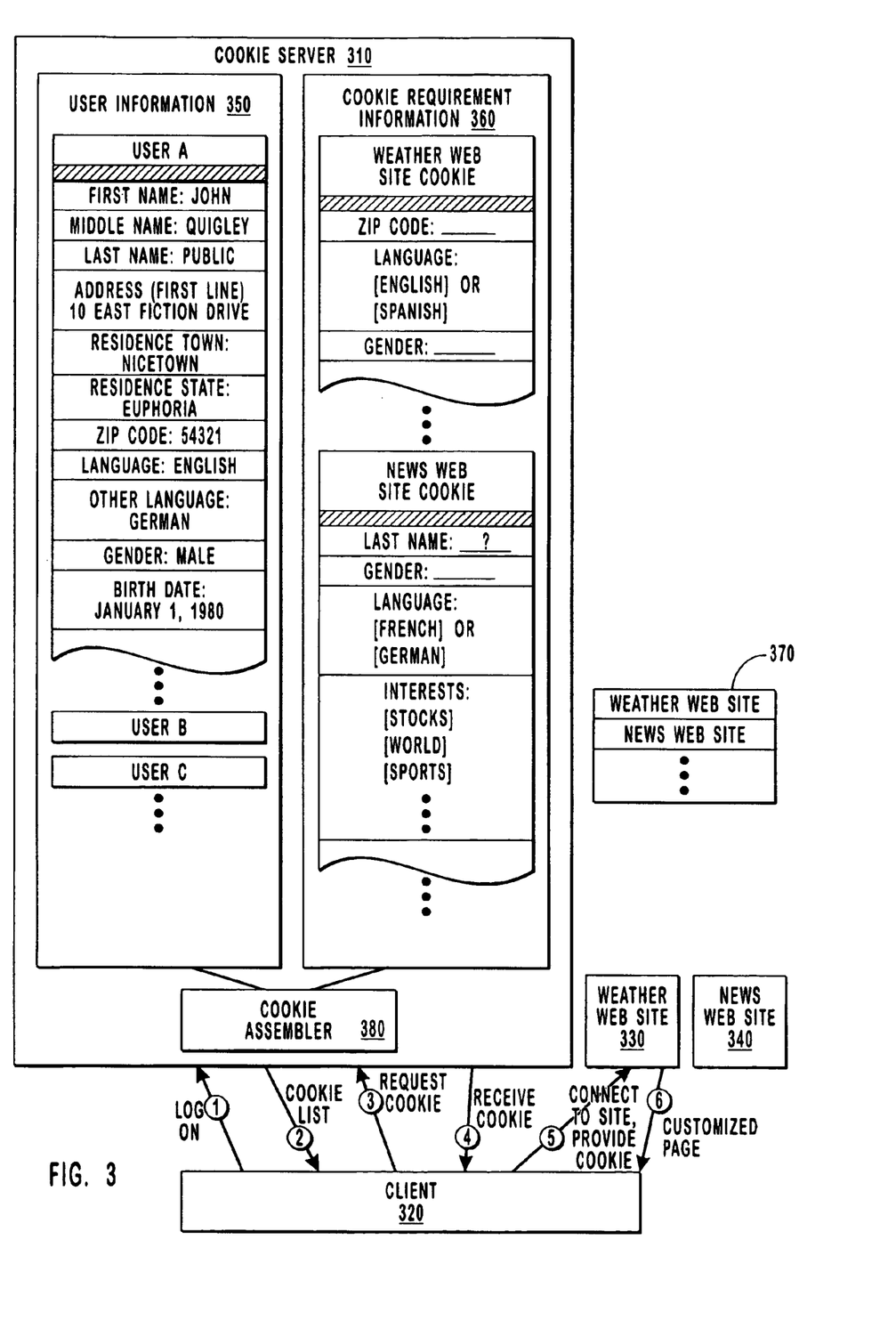
FIG. 3 schematically illustrates a client/server system in accordance with the present invention.
Figure 4:
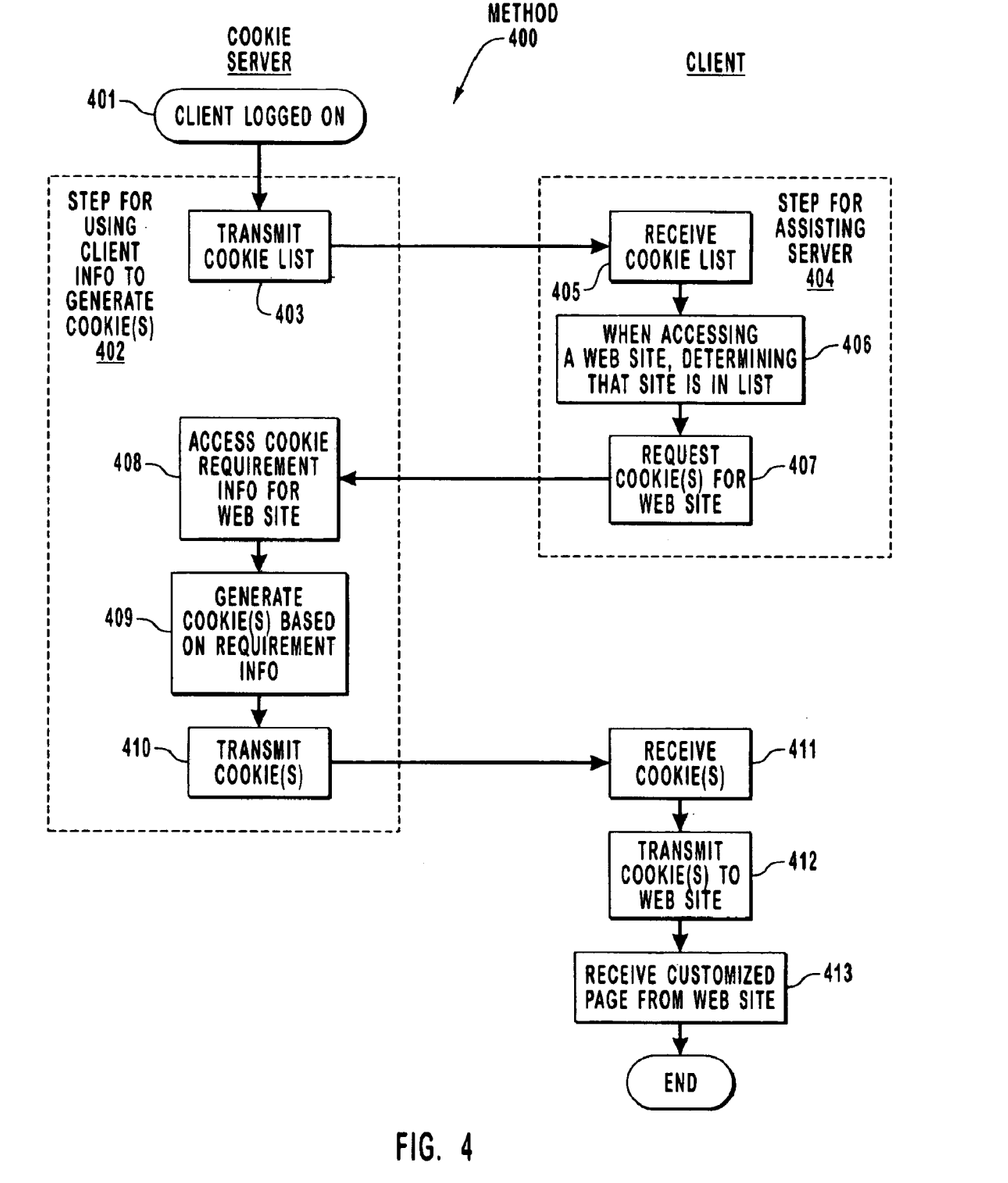
FIG. 4 is a flow diagram of a method of automatically generating a cookie for use in customizing web pages, in accordance with the present invention.

Having described an environment in which the present invention may be implemented with reference to FIG. 1 and FIG. 2, the operation of embodiments of the present invention will now be described in further detail with respect to FIG. 3 and FIG. 4. FIG. 3 illustrates a client/server architecture 300 in accordance with the present invention. When a client 320 is to connect with a web site such as weather web site 330 or news web site 340, the cookie server 310 provides the appropriate cookie or cookies for that web site to the client 320. The client 320 then provides that cookie(s) to the web site so that the web site may provide a customized page to the client 320.

The detailed operation and the remaining features of the client/server architecture of FIG. 3 will be described with respect to FIG. 4, which illustrates a flowchart of a method 400 of the server generating cookies and the client using those cookies so that web sites may provide customized pages to the client. In this method, steps and acts performed by the cookie server are listed in the left hand column under the heading "COOKIE SERVER" while those steps and acts performed by the client are listed in the right hand column under the heading "CLIENT".

Once the client logs into the cookie server (act 401), the cookie server then uses information specific to the client (or user thereof) to generate a cookie or cookies tailored to the information required by a web site that the client is to access. Accordingly, embodiments within the scope of the present invention include a means and step for using client information to generate one or more cookies tailored to the information required by a web site that the client is to access (step 402). The means for performing this function is illustrated in FIG. 3 as cookie server 310, although any hardware or software or hardware/software combination that accomplishes the function will suffice. The step for performing this function is illustrated in FIG. 4 as corresponding acts 403, 408, 409 and 410, although any acts that accomplish the step will suffice.

In act 403, the cookie server transmits (act 403) a cookie list to the client, which then receives the cookie list (act 405). Receiving the cookie list is the first act in a series of corresponding acts that the client performs in accomplishing a step for assisting the server so that if the client is to access a particular web site, the server transmits to the client a cookie associated with the web site (step 404). As evident from FIG. 3, the cookie list 370 includes entries associated with web sites that have provided cookie requirement information to the cookie server.

Also included in the step for assisting the server (step 404) is an act of, when accessing a particular web site, determining that the particular web site is associated with an entry in the cookie list (act 406). The browser software associated with the client may be configured to consult the cookie list each time the browser software is to issue a request for a page from a web site to verify whether or not that web site is included in the cookie list. If the web site is included in the cookie list, then the client requests the corresponding cookie or cookies from the web site (act 407), thus completing the step for assisting the server (step 404).

The cookie server then accesses cookie requirement information 360 corresponding to the web site (act 408). For example, suppose the client was to access the weather web site 330, the corresponding cookie requirements might require the zip code (see cookie requirement information 360 in FIG. 3) thereby allowing the weather web site to provide a weather forecast specific to the user's zip code. The cookie requirement might also require the language of the user thereby tailoring the web page to the language of the user. The gender of the user may also be useful to properly address the user as "Mr." or "Ms." The cookie requirements for a news web site might require the last name of the user so that the web site can properly address the user, the user gender, the user language, and the user interests so that news related to items of particular interest may be presented to the user.

The cookie server then generates one or more cookies based on the cookie requirement information and user information (e.g., user information 350) corresponding to the user (act 409). In other words, for each item of the cookie requirement information, the cookie server would gather the relevant user information and forward that information back to the client 320. For each piece of information, the cookie server will send the name of the item (i.e. zip code, language, gender, etc.) along with the specified user's relevant information (54321, English, male, etc.).

For example, suppose that the client is to access the weather web site 330, and that the user logged onto the cookie server as user A. The cookie server 310 would refer to the cookie requirement information for the weather web site to determine that the zip code of the user is needed. Referring to user A's information in user information 350 of FIG. 3, the cookie server 310 would generate a cookie that includes "54321" as the "zip code". The cookie requirement information also requires a language of the user to be chosen between English and Spanish. The user information indicates that the user's primary language is English and that the user reads a second language, German. The cookie server 310 would then generate a cookie that includes "English" as the "language". The cookie requirement information also requires a gender. Thus, the cookie server 310 would generate a cookie that includes "male" as the "gender". The resulting cookies are then transmitted back to the client (act 410) thus completing the step for using the client information to generate one or more cookies (step 402). The client then receives the generated cookie(s) (act 411) and supplies the cookie(s) to the web site (act 412) so that the web site may provide a customized page to the client (act 413).

Note that the cookie server 310 generates a cookie for each item of the cookie requirement information. Alternatively, the cookie server 310 might combine multiple items of the cookie requirement information into a single cookie using a cookie assembler 380. For example, when the user initiates a connection to the weather web site 330, the cookie assembler may generate a cookie that includes all of the relevant user information such as zip code, language, and gender. The cookie server would then transmit that single cookie back to the client 320.

Typically, when accessing a web site for the first time, the web site will prompt the user to enter user specific information that may be used to customize pages provided to the user. The web site then typically stores the user information in one or more cookies and has the client store the cookie(s). When the client subsequently navigates to the web site, the client browser software conventionally provides the cookie(s) to the web site so that the web site can provide customized web pages to the client. However, when accessing a different Web site, the user would typically need to reenter user information for that different Web site, even if the two Web sites are closely affiliated.

For example, suppose that a user desires to order a book from an on-line book store Web site. The user would be required to enter user information relevant to the purchase. The user might then select a "Special Shipping Instructions" link which navigates the user to the association shipping web site. Conventional methods often require that the user once again enter for the shipping Web site much of the same user information that was entered for the on-line bookstore Web site. The present invention, however, permits the user to enter this user information once, and allows that user information to be shared with other affiliated sites. Thus, the user appears to be dealing with one unified entity from the standpoint of having to enter personal information when, in fact, there may be several affiliated on-line entities with which the user is communicating. This provides the user with a single unified experience when accessing affiliated Web sites.

The present invention is especially advantageous when user input is made more difficult by the limitation in smaller navigation devices such as wireless telephones and Personal Digital Assistants (PDAs). Instead of needing to enter customization information at multiple sites using a limited user interface, the user can enter that information once and then, when visiting affiliated sites, the user will not need to re-enter the information, even when visiting a site for the first time.

In addition, although the resulting cookie generated by the cookie server may be stored at the client for subsequent navigation to the web site, this is not necessary. The cookie server may store the cookie and or automatically generate the cookie each time the user navigates to the web site. This eliminates the former requirement that the client itself store the cookie. This may be especially useful in devices that have limited memory such as, for example, mobile telephones and PDAs.

In addition, the present invention allows the cookie to be more dynamic. For example, a user may have hundreds of associated cookies that are used when navigating to hundreds of different Web sites. If the user moves, for example, the user's address and zip code will change. Conventionally, in order to optimize service at these hundreds of web sites, the user would have to navigate through these web sites, and change the address for each web site, thereby allowing the web site to change the corresponding cookie at the client. The present invention allows the user to change the user information in each of these cookies by simply changing the user information stored at the cookie server. The cookie server would then update all of the corresponding cookies that the server is storing. Alternatively, the update would be postponed until a subsequent navigation to the web site when the cookie server would generate a cookie with the new user information without requiring further user input.

Thus, when the user's information changes, the user need not engage in further data entry as the user navigates to each of the web sites. Instead, the user only changes the user information at the cookie server. This enhances the unified experience of the user since a change to user information for one Web site will be made for all affiliated Web sites.

In sum, the principles of the present invention reduce the amount of user input required when navigating through web sites or when changing user information, and optionally preserves the memory capacity of the client. In addition, the present invention provides a unified experience for the user, as far as inputting user information is concerned, when navigating to affiliated Web sites.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a server that provides cookies associated with web sites for a client, a method for generating for the client one or more cookies associated with a web site based on requirements defined by the web site such that the web site an generate a web document that has been customized for the client, the method comprising the following:

storing user information at the server that can be used to generate cookies;

registering one or more web sites at the server, wherein registering the web sites includes receiving from each web site cookie requirement information specifying what data fields are expected in cookies submitted from a client to the web site;

storing the cookie requirement information at the server;

providing to the client, a list of web sites that have registered with the server, wherein the server is capable of generating and providing cookies associated with any of said web sites to the client, and wherein the client, prior to issuing a request for a document from a particular web site, determines whether said particular web site is on the list of web sites provided by the server;

receiving information from the client indicating that the client is accessing said particular web site, which is registered with the server, and wherein said information is transmitted to the server by the client upon the client determining that the particular web site is on the list of web sites;

in response to receiving the information from the client, generating one or more new cookies associated with the particular web site based on the stored cookie requirement in information and the stored user information; and transmitting the one or more newly generated cookies to the client, wherein the client subsequently transmits the onw or more newly generated cookies to the web site to obtain a customized web document.

2. A method as recited in claim 1, wherein the information received from the client includes a request for one or more cookies corresponding to the particular web site.

3. A method as recited in claim 1, further comprising, for at least some of the web sites in the cookie list, receiving the cookie requirement information from an administrator of the web site.

4. A method as recited in claim 1, futher comprising the following:

receiving an indication that a user situation has changed; and changing the user specific information to reflect the change in the user situation.

5. A method as recited in claim 1, further comprising storing the one or more generated cookies so as to be accessible to the server.

6. A method as recited in claim 5, further comprising the following:

receiving a subsequent indication that the client is again accessing the particular web site; and transmitting the stored one or more cookies to the client in response to subsequent indication, rather than regenerating the one or more cookies.

7. A method as recited in claim 1, further comprising the following receiving a subsequent indication that the client is again accessing the particular web site;

regenerating the one or more cookies associated with the paticular web site based on the accessed cookie requirement information; and transmitting the regenerated one or more cookies to the client.

8. A method as recited in claim 1, wherein the client checks the list of web sites prior to issuing any request for a document from any web site to verify whether said any web site is on the list of web sites.

9. A method as recited in claim 1, wherein the client accesses the customized web document without storing any of the one or more newly generated cookies.

10. A method as recited in claim 1, wherein generating the one or more new cookies includes generating a plurality of different cookies for different fields specified in the cookie requirement information with relevant user information.

11. A method as recited in claim 1, wherein generating the one or more new cookies includes generating at least one cookie that combines multiple items of the cookie requirement information and relevant user information.

12. A method as recited in claim 1, wherein the server regenerates the one or more cookies each time the client navigates to the web site, and such that the and client and the server do not have to store the one or more cookies.

13. A computer program product comprising a computer-readable medium having stored thereon computer-executable instruction for implementing the recited in claim 1.

14. The computer program product as recited in claim 13, wherein the computer-readable medium is a physical storage media.

15. A computer program product as recited in claim 13, further comprising computer-executable instructions for implementing the following:

detecting the receipt of an indication that a user situation has changed; and changing the user specific information to reflect the change in the user situation.

16. A computer program product as recited in claim 13, wherein the computer-readable medium also has stored thereon computer-executable instructions for causing the one or more generated cookies to be stored so as to be accessible to the server.

17. A computer program product as recited in claim 16, wherein the computer-readable medium also has stored thereon computer-executable instructions for performing the following:

detecting the receipt of a subsequent indication that the client is again accessing the particular web site; and causing the one or more stored cookies to be transmitted to the client in response to subsequent indication, rather than regenerating the one or more cookies.

18. A computer program product as recited in claim 13, wherein the computer-readable medium also has stored thereon computer-executable instructions for performing the following:

detecting the receipt a subsequent indication that the client is again accessing the particular web site;

regenerating the one or more cookies associated with the particular web site based on the accessed cookie requirement information; and causing the one or more regenerated cookies to be transmitted to the client.

19. In a client that is capable of communicating with a server that provides, to the client, cookies associated with web sites and, the client further being capable of communicating with the web sites, a method of obtaining a customized web document from a web site using one or more cookies generated by the server, the method comprising the following:

providing user information to the server that is stored at the server and that can be used to generate cookies requirement information that is also stored at the server and that is provided to the server by one or more web site registered with the server, the cookie requirement information specifying what data fields are expected in cookies submitted from a client to the web site;

receiving a list from the server containing the web sites registered with the server, wherein the server is capable of generating and generating and providing cookies associated with any of the web sites to the client;

initiating a connection to a particular web site;

wherein prior to initiating a connection to the particular web site, determining that the particular web site is associated with an entry in the cookie list;

upon determining that the particular web site is associated with an entry in the cookie list, requesting, from the server, one or more new cookies associated with the particular web site; and receiving, from the server, the one or more new cookies associated with the particular web site, the one or more new cookies having been generated by the server in response to receiving information from the client indicating that the client is initiating a connection to the particular web site, wherein the server generated the one or more new cookies based on the cookie requirement information and the user information.

20. A method as recited in claim 19, further comprising the following:

transmitting the one or more cookies to the particular web site; and receiving from the particular web site a customized web document that has been generated at the web site using the one or more cookies.

21. A method as recited in claim 19, wherein the acts of requesting the one or more cookies and receiving the one or more cookies are conducted without the client transmitting to the server any client information that is to be included in the one or more cookies after determining that the particular web site is associated with an entry in the cookie list.

22. A method as recited in claim 19, wherein accessing the particular web site is being conducted for the first time, such that receiving the one or more cookies is conducted as the client accesses the particular web site for the first time.

23. A computer program product comprising a computer-readable medium having stored thereon computer-executable instructions for implementing the method recited in claim 19.

24. A computer program product as recited in claim 23, wherein the computer-readable medium comprises a physical storage medium.

25. A computer program product as recited in claim 23, wherein the method further comprises the following:

causing the one or more received cookies to be transmitted to the particular web site; and detecting the receipt, from the particular web site, of a customized web document that has been generated at the web site using the one or more received cookies.

* * * * *

UNITED STATES PATENT AND TRADEMARK OFFICE
CERTIFICATE OF CORRECTION

PATENT NO.       : 6,934,736 B2
APPLICATION NO.  : 09/808857
DATED            : August 23, 2005
INVENTOR(S)      : Sears, Jr. et al.

It is certified that error appears in the above-identified patent and that said Letters Patent is hereby corrected as shown below:

In column 4, line 56, delete "transfer" and insert -- transferred --, therefor.

In column 7, line 56, after "simultaneously" insert -- . --.

In column 11, line 26, in Claim 1, delete "an" and insert -- can --, therefor.

In column 11, line 38, in Claim 1, after "providing" insert -- , --.

In column 11, line 55, in Claim 1, delete "in" before "information".

In column 11, line 59, in Claim 1, delete "onw" and insert -- one --, therefor.

In column 12, line 1, in Claim 4, delete "futher" and insert -- further --, therefor.

In column 12, line 18, in Claim 7, after "following" insert -- : --.

In column 12, line 22, in Claim 7, delete "paticular" and insert -- particular --, therefor.

In column 12, line 43, in Claim 12, after "that the" delete "and".

In column 12, line 47, in Claim 13, delete "instruction" and insert -- instructions --, therefor.

In column 12, line 47, in Claim 13, after "implementing the" insert -- method --.

In column 13, line 10, in Claim 18, after "receipt" insert -- of --.

In column 13, line 26, in Claim 19, after "cookies" insert -- with cookie --.

In column 13, line 29, in Claim 19, delete "site" and insert -- sites --, therefor.

In column 13, line 34, in Claim 19, after "generating and" delete "generating and".

UNITED STATES PATENT AND TRADEMARK OFFICE
CERTIFICATE OF CORRECTION

PATENT NO.         : 6,934,736 B2
APPLICATION NO. : 09/808857
DATED                : August 23, 2005
INVENTOR(S)       : Sears, Jr. et al.

It is certified that error appears in the above-identified patent and that said Letters Patent is hereby corrected as shown below:

In column 14, line 8, in Claim 19, delete "generated" and insert -- generates --, therefor.

Signed and Sealed this

Twenty-fifth Day of August, 2009

David J. Kappos
*Director of the United States Patent and Trademark Office*